(12) United States Patent
Im et al.

(10) Patent No.: US 12,455,317 B2
(45) Date of Patent: Oct. 28, 2025

(54) LOGIC BIST CIRCUIT AND SEMICONDUCTOR DEVICE INCLUDING SAME

(71) Applicant: SAMSUNG ELECTRONICS CO., LTD., Suwon-si (KR)

(72) Inventors: Sangsoon Im, Suwon-si (KR); Sungcheol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/659,942

(22) Filed: May 9, 2024

(65) Prior Publication Data

US 2024/0426909 A1 Dec. 26, 2024

(30) Foreign Application Priority Data

Jun. 22, 2023 (KR) .................. 10-2023-0080679
Sep. 12, 2023 (KR) .................. 10-2023-0121271

(51) Int. Cl.
*G01R 31/3185* (2006.01)
*G01R 31/3181* (2006.01)

(52) U.S. Cl.
CPC . *G01R 31/318555* (2013.01); *G01R 31/3181* (2013.01); *G01R 31/318536* (2013.01); *G01R 31/318541* (2013.01)

(58) Field of Classification Search
CPC ........ G01R 31/318555; G01R 31/3181; G01R 31/318536; G01R 31/318541; G01R 31/318335; G01R 31/318594; G01R 31/318552; G01R 31/31727; G01R 31/3177; G01R 31/3187; G01R 31/31908; G01R 31/31921; G11C 29/12; G11C 29/12015

See application file for complete search history.

(56) References Cited

U.S. PATENT DOCUMENTS 8,887,019 B2   11/2014 Chakravadhanula et al.
10,234,505 B1 *  3/2019 Shivaray ........ G01R 31/318552
(Continued)

FOREIGN PATENT DOCUMENTS

KR   10-2020-0003166 A   1/2020

OTHER PUBLICATIONS

R. Shaikh et al., "At-speed capture power reduction using layout-aware granular clock gate enable controls," 2014 International Test Conference, Seattle, WA, USA, 2014, pp. 1-10, (Year: 2014).*
(Continued)

*Primary Examiner* — Cynthia Britt
(74) *Attorney, Agent, or Firm* — Sughrue Mion, PLLC

(57) ABSTRACT

Provided are a logic built-in self-test (BIST) circuit that performs a scan test improving test coverage for each clock domain and a semiconductor device including the logic BIST circuit. The logic BIST circuit includes an OR gate configured to receive a scan enable signal and a register setting signal, and generate a modified scan enable signal; a clock gating circuit configured to output an enable clock irrespective of a function enable signal when the register setting signal has a first logic value, and a scan chain configured to capture an output of a first logic circuit connected to flip-flops according to the enable clock.

18 Claims, 17 Drawing Sheets

(56) References Cited

U.S. PATENT DOCUMENTS

| | | |
|---|---|---|
| 10,317,464 B2 | 6/2019 | Chaudhuri |
| 10,393,804 B2 | 8/2019 | Srinivasan et al. |
| 10,685,730 B1 | 6/2020 | Shah et al. |
| 11,016,145 B1 | 5/2021 | Lesser et al. |
| 11,085,965 B2 | 8/2021 | Cote |
| 11,592,481 B1* | 2/2023 | Jaini .............. G01R 31/318342 |
| 2014/0208175 A1 | 7/2014 | Kumar et al. |
| 2014/0281717 A1 | 9/2014 | Ahmed |
| 2014/0281778 A1* | 9/2014 | Ahmed ................... G06F 11/27 714/733 |
| 2016/0169966 A1 | 6/2016 | Abshishek et al. |
| 2021/0279391 A1* | 9/2021 | Hasegawa ...... G01R 31/318563 |
| 2023/0079000 A1 | 3/2023 | Sarmiento et al. |
| 2024/0427366 A1* | 12/2024 | Srinivasan ..... G01R 31/318575 |

OTHER PUBLICATIONS

Communication dated Sep. 18, 2024, issued by European Patent Office in European Patent Application No. 24165689.1.

Devta-Prasanna, Narendra et al., "Clock Gate Test Points", 2010 IEEE International Test Conference, Nov. 2-4, 2010. (11 pages total).

\* cited by examiner

FIG. 12C

| CNT_2 | CNT_1 | CNT_0 | L0 | L1 | L2 | P_0 | P_1 | P_2 | P_3 |
|---|---|---|---|---|---|---|---|---|---|
| 0 | 0 | 0 | 0 | 0 | 0 | 0 | 1 | 0 | 0 |
| 0 | 0 | 1 | 1 | 1 | 0 | 0 | 0 | 1 | 0 |
| 0 | 1 | 0 | 1 | 0 | 1 | 0 | 0 | 0 | 1 |
| 0 | 1 | 1 | 0 | 1 | 1 | 1 | 0 | 0 | 0 |
| 1 | 0 | 0 | 0 | 1 | 1 | 0 | 1 | 0 | 0 |
| 1 | 0 | 1 | 1 | 0 | 1 | 0 | 0 | 0 | 1 |
| 1 | 1 | 0 | 1 | 1 | 0 | 0 | 0 | 1 | 0 |
| 1 | 1 | 1 | 0 | 0 | 0 | 1 | 0 | 0 | 0 |

LOGIC BIST CIRCUIT AND SEMICONDUCTOR DEVICE INCLUDING SAME

CROSS-REFERENCE TO RELATED APPLICATIONS

This application claims priority to Korean Patent Application Nos. 10-2023-0080679, filed on Jun. 22, 2023, and 10-2023-0121271, filed on Sep. 12, 2023, in the Korean Intellectual Property Office, the disclosures of which are incorporated by reference herein in their entireties.

BACKGROUND

The present disclosure relates to a logic built-in self-test (BIST) circuit including a clock gating circuit and a semiconductor device including the logic BIST circuit, and more particularly, to a logic BIST circuit performing a scan test capable of improving test coverage for each of clock domains.

Design for testability (hereinafter, referred to as DFT) technology has been widely used to test semiconductor devices. Using DFT technology, defects in logic circuits and defects that affect operating speeds may be detected. For example, a scan test, in which scan flip-flops connected in the form of scan chains are added to a logic circuit to be tested, may be used. A scan test may be conducted by preparing in advance optimal patterns for testing circuits in a semiconductor device and storing expected data for comparing the patterns and test outputs in large memory of auto test equipment (ATE). However, when testing is required during an operation of a system with semiconductor devices installed, it an external storage may not be available for storing large amounts of data as well as an ATE. Accordingly, a logic built-in self-test (hereinafter, referred to as LBIST) technique has been used to self-test logic circuits in semiconductor devices.

However, the signals used in the LBIST may be randomly generated, which may negatively impact reliability and accuracy of performed tests. Therefore, there is a need for an improved LBIST technique and device.

SUMMARY

One or more example embodiments provide a logic built-in self-test (BIST) circuit having improved scan test coverage.

The inventive concept also provides a logic BIST circuit having improved test coverage and performing a low-power test on a semiconductor device mounted on a system.

According to an aspect of an example embodiment, a logic BIST circuit includes: a first OR gate configured to receive a scan enable signal and a first register setting signal, and generate a first modified scan enable signal; a first clock gating circuit configured to receive a first clock and output a first enable clock, according to the first modified scan enable signal and a first function enable signal; a first scan chain configured to load first scan data into first flip-flops according to the first enable clock, capture an output of a first logic circuit connected to the first flip-flops, and output captured data; a second OR gate configured to receive the scan enable signal and a second register setting signal, and generate a second modified scan enable signal; a second clock gating circuit configured to receive a second clock and output a second enable clock, according the second modified scan enable signal and a second function enable signal; and a second scan chain configured to load second scan data into second flip-flops according to the second enable clock, capture an output of a second logic circuit connected to the second flip-flops, and output the captured data. At least one of the first clock gating circuit and the second clock gating circuit is configured to output a corresponding enable clock, irrespective of a corresponding function enable signal, when a corresponding register setting signal has a first logic value.

According to another aspect of an example embodiment, a logic BIST circuit includes: a decompressor configured to sequentially generate a plurality of test patterns; a pattern counter configured to count a number of the plurality of test patterns and generate counting signals; a first OR gate configured to receive a scan enable signal and a first counting signal among the counting signals and generate a first modified scan enable signal; a first clock gating circuit configured to receive a first clock and output a first enable clock, according to the first modified scan enable signal and a first function enable signal; and a first scan chain configured to load first scan data into first flip-flops according to the first enable clock, capture an output of a first logic circuit connected to the first flip-flops, and output captured data. The first clock gating circuit is further configured to, when the first counting signal has a first logic value, output the first enable clock irrespective of a state of the first function enable signal.

According to another aspect of an example embodiment, a logic circuit includes: a decompressor configured to sequentially generate a plurality of test patterns; a pattern counter configured to count a number of the plurality of test patterns generated by the decompressor and generate counting signals; a pulse generator configured to receive at least some of the counting signals and generate pulse signals; a first OR gate configured to receive a scan enable signal and a first pulse signal among the pulse signals and generate a first modified scan enable signal; a first clock gating circuit configured to receive a first clock and output a first enable clock, according to the first modified scan enable signal and a first function enable signal; and a first scan chain configured to load first scan data into first flip-flops according to the first enable clock, and capture and output an output of a first logic circuit connected to the first flip-flops.

According to another aspect of an example embodiment, a semiconductor device includes: a first core including first logic circuits and a first logic BIST circuit configured to perform a first scan test on the first logic circuits; and a second core including second logic circuits and a second logic BIST circuit configured to perform a second scan test on the second logic circuits. Each of the first logic BIST circuit and the second logic BIST circuit includes: a decompressor configured to sequentially generate a plurality of test patterns; a pattern counter configured to count a number of the plurality of test patterns generated, and generate counting signals; a pulse generator configured to receive at least some of the counting signals and generate pulse signals; a first OR gate configured to receive a scan enable signal and a first pulse signal among the pulse signals and generate a first modified scan enable signal; a first clock gating circuit configured to receive a first clock and output a first enable clock, according to the first modified scan enable signal and a first function enable signal; and a first scan chain configured to load first scan data into first flip-flops according to the first enable clock, and capture and output an output of a first logic circuit connected to the first flip-flops.

According to another aspect of an example embodiment, a pulse generation circuit includes: a first AND gate configured to receive a first signal having a first period and a second signal having a second period that is twice as long as the first period, and output a first pulse signal; a first XOR gate configured to receive the second signal and the first signal and output a first internal signal; a first NAND gate configured to receive the first pulse signal and the first internal signal and output a second pulse signal; a second XOR gate configured to receive the first signal and a third signal having a third period that is twice as long as the second period, and output a second internal signal; a second AND gate configured to receive the first internal signal and the second internal signal and output a third pulse signal; a third XOR gate configured to receive the second signal and the third signal and output a third internal signal; and a third AND gate configured to receive the second internal signal and the third internal signal and output a fourth pulse signal. Each of the first to fourth pulse signals maintains a first logic value during a half period of the first signal in different sections.

BRIEF DESCRIPTION OF DRAWINGS

The above and other aspects will be more apparent from the following description of example embodiments, taken in conjunction with the accompanying drawings, in which:

FIG. 12C is a truth table of the pulse generator of FIG. 12A according to an example embodiment;

DETAILED DESCRIPTION

Figure 1:
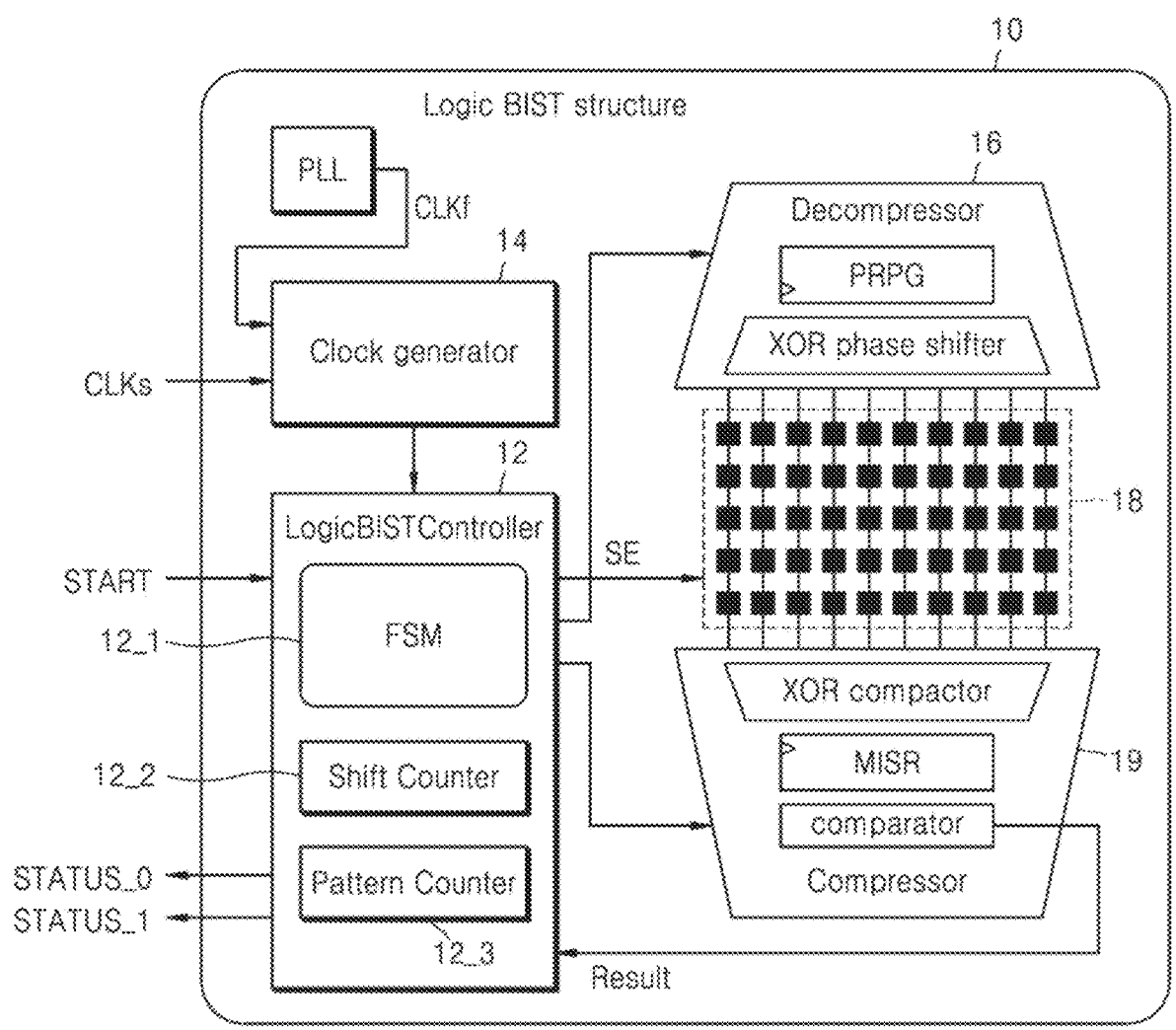
FIG. 1 shows a block diagram of a logic built-in self-test (LBIST) including a plurality of scan chains.

Hereinafter, example embodiments will be described in detail with reference to the accompanying drawings. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Although the terms "first," "second," or the like may be used herein to describe various elements, these elements should not be limited by these terms. These terms are only used to distinguish one element from another element. For example, a first element may be referred to as a second element, and similarly, a second element may be referred to as a first element without departing from example embodiments.

It is understood that when an element is referred to as being "connected to" or "coupled to" another element, it can be directly connected or coupled to another element, or an intervening element may be present therebetween. On the other hand, it is understood that when an element is referred to as being "directly connected to" or "directly coupled to" another element, there is no intervening element. Other expressions that describe relationships between elements, such as "between" and "directly between" or "adjacent to" and "directly adjacent to", may also be interpreted in the same manner as above.

The terms herein are used to explain example embodiments and not intended to limit the present disclosure. The singular forms include the plural forms as well, unless the context clearly indicates otherwise. In this specification, it will be understood that the term "includes" or "comprises", when used herein, specifies the presence of stated features, integers, steps, operations, elements, components, or a combination thereof, but does not preclude the presence or addition of one or more other features, integers, steps, operations, elements, components, or combinations thereof.

Hereinafter, example embodiments are described in detail with reference to the accompanying drawings. In the drawings, identical components may be described using the same symbols or reference numerals if possible.

FIG. 1 shows LBIST blocks including a plurality of scan chains. An LBIST structure 10 may include a controller 12, a clock generator 14, a decompressor 16, scan chains 18, and a compressor 19. The controller 12 includes a finite state machine (FSM) 12_1 for controlling the overall operating state of the LBIST structure 10 and generating a scan enable signal SE for each of test patterns, a shift counter 12_2 for counting shift operations of flip-flops of each of the scan chains 18, and a pattern counter 12_3 for counting the number of test patterns. The clock generator 14 may receive a shift clock CLKs, receive an operation clock CLKf from a phase lock loop (PLL), and generate clocks used for a test operation under control of the controller 12. The decompressor 16 may include a pseudo-random pattern generator (PRPG) including a linear feedback shift register (LFSR) and an exclusive-OR (XOR) phase shifter for adding more randomness to the data generated by the PRPG. Each of the plurality of scan chains 18 includes flip-flops connected in chains and logic circuits connected thereto. Each of the scan chains 18 latches scan data, transmitted from the decompressor 16, to the flip-flops in response to the scan enable signal SE generated by the controller 12, and captures the resulting data passing through a logic circuit connected to the scan chain and then outputs the captured data to the compressor 19. The above operations are repeated for each of test patterns. The compressor 19 includes an XOR compactor for compacting the data output from the plurality of scan chains 18, a multiple input signature register (MISR), and a comparator for generating test results.

Figure 2:
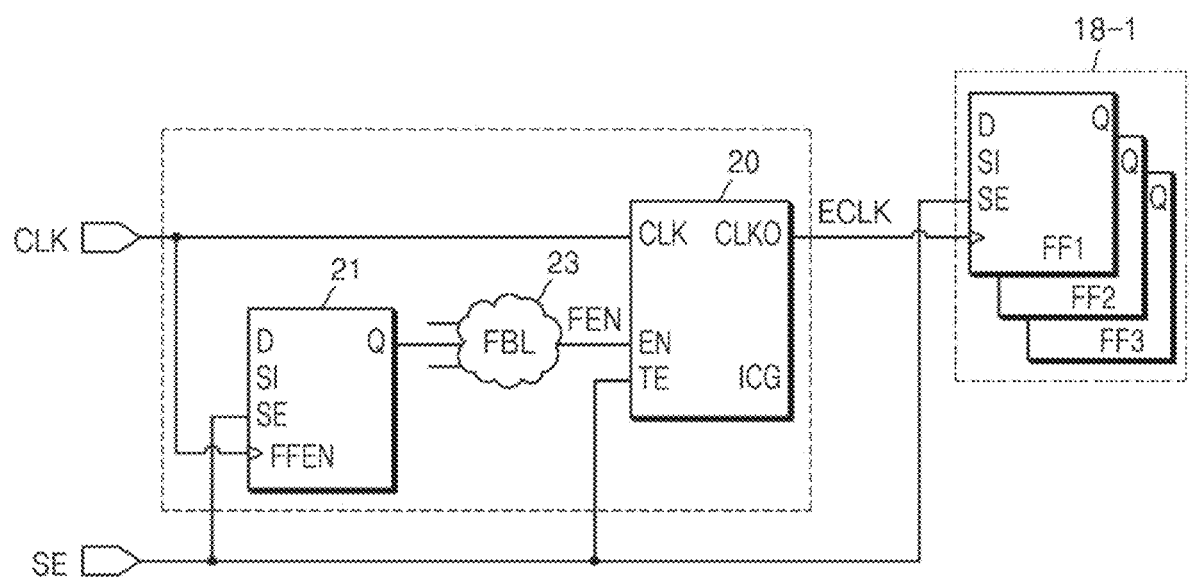
FIG. 2 shows a connection between the scan chain of FIG. 1 and a clock gating circuit.
Figure 3:
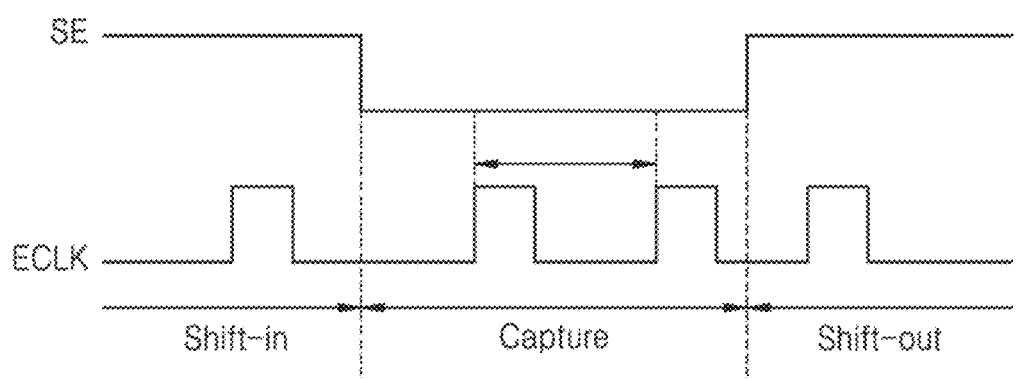
FIG. 3 is a timing diagram of a scan test operation.

FIG. 2 shows connection between one of the scan chains of the LBIST structure 10 of FIG. 1 and a clock gating circuit. FIG. 3 shows a timing diagram illustrating sections of a scan test operation in a LBIST.

Referring to FIG. 2, for a low-power functional mode and a low-power test operation, a clock gating circuit 20 may transmit or block a gated enable clock ECLK to flip-flops FF1, FF2, FF3, ..., of a scan chain 18-1. The clock gating circuit 20 receives the scan enable signal SE from the controller 12 of FIG. 1, receives a clock CLK from the clock generator 14, and receives a function enable signal FEN from a function enable logic 23 and a flip-flop 21 connected thereto.

Referring to FIG. 3, a scan test operation sequentially includes a shift-in section in which the scan enable signal SE is at logic "1", a capture section in which the scan enable signal SE is at logic "0", and a shift-out section in which the scan enable signal SE is at logic "1".

Referring to FIGS. 2 and 3 together, the clock gating circuit 20 transmits the gated enable clock ECLK to all flip-flops in the scan chain 18-1, in the shift-in section and the shift-out section, in which the scan enable signal SE is at logic "1". The clock gating circuit 20 transmits the gated enable clock ECLK to the flip-flops of the scan chain 18-1 only when a function enable signal FEN is at logic "1", in the capture section in which the scan enable signal SE is at logic "0". However, in the capture section, an output logic value of the flip-flop 21 and the function enable logic 23, which determine the function enable signal FEN, are randomly determined by random scan data generated by the PRPG of FIG. 1. Accordingly, it is not easy to specify the logic value of the function enable signal FEN as "1" in the capture section. Therefore, there may be limitations in capturing the output value of the logic circuit of the scan chain 18-1 with respect to the flip-flops FF1, FF2, FF3, ... in a desired capture section. This makes it difficult to detect defects defined in a scan test and increase test coverage.

Figure 4:
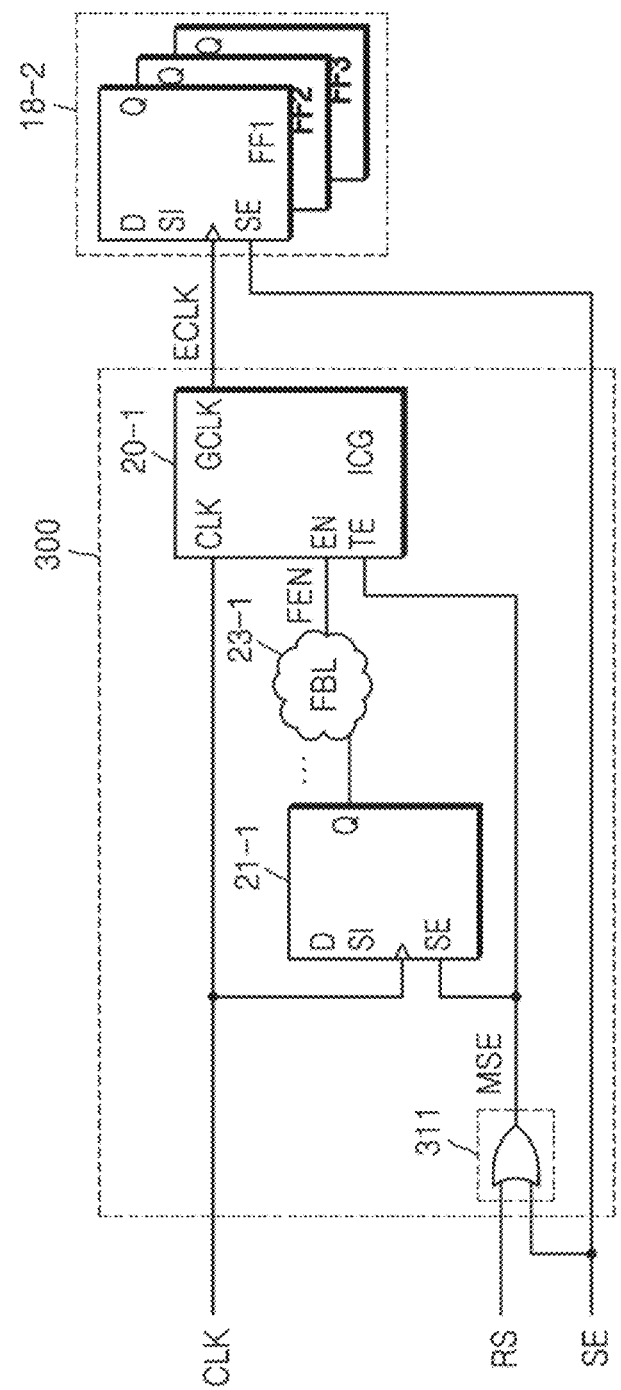
FIG. 4 shows a connection between a test clock gating circuit and a scan chain according to an example embodiment.

FIG. 4 shows a connection relationship between a test clock gating circuit 300 and a scan chain 18-2 according to an example embodiment.

Referring to FIG. 4, the test clock gating circuit 300 may include a first OR gate 311 and a clock gating circuit 20-1. The test clock gating circuit 300 may further include a flip-flop 21-1 and a function enable logic 23-1. The flip-flop 21-1 and the function enable logic 23-1 may be same as those described above with reference to FIG. 2. The first OR gate 311 may receive a scan enable signal SE and a register setting signal RS, and generate a modified scan enable signal MSE. The scan enable signal SE is transmitted from the controller 12 of FIG. 1 as shown in FIG. 3, and may maintain logic "1" in both the shift-in section and the shift-out section of the scan test operation, and may maintain logic "0" in the capture section of the scan test operation. The register setting signal RS may be set by an external device or user for a scan test operation and may be set to logic "1" or "0" during the scan test. For example, when the register setting signal RS is set to logic "1", the first OR gate 311 may generate and maintain the modified scan enable signal MSE at logic "1", irrespective of the scan enable signal SE.

The clock gating circuit 20-1 receives the modified scan enable signal MSE via a test enable terminal TE and receives a function enable signal FEN from the function enable logic 23-1 via a function enable terminal EN. In response to these signals (e.g., the modified scan enable signal MSE and the function enable signal FEN), the clock gating circuit 20-1 may transmit or may not transmit a clock CLK, received via a clock terminal CLK, to flip-flops of the scan chain 18-2 using a gated enable clock ECLK. That is, the clock gating circuit 20-1 may output the received clock CLK via the gated enable clock ECLK, only when at least one of the signals input to the test enable terminal TE and the function enable terminal EN is at logic "1". The gated enable clock ECLK may be simply referred to as the enable clock ECLK. Also, the gated enable clock ECLK may be referred to as a gated clock signal.

When the register setting signal RS is set to logic "1", the first OR gate 311 maintains the modified scan enable signal MSE at logic "1" regardless of the scan enable signal SE. In response to this state, the clock gating circuit 20-1 may transmit the received clock CLK to flip-flops of the scan chain 18-2 via the gated enable clock ECLK, regardless of the function enable signal FEN. On the other hand, when the register setting signal RS is set to logic "0", the test clock gating circuit 300 may transmit or block the gated enable clock ECLK in response to the function enable signal FEN in the capture section, like the clock gating circuit 20 in FIG. 2.

The scan chain 18-2 may include a plurality of flip-flops connected in chains and a logic circuit connected thereto. The scan chain 18-2 may load scan data, transmitted from the decompressor 16 of FIG. 1, into flip-flops of a plurality of scan chains 18 in response to the enable clock ECLK and may capture the output of the logic circuit connected to the plurality of flip-flops and output the captured data to the compressor 19 of FIG. 1.

In the test clock gating circuit 300, when the register setting signal RS is set to logic "1", the enable clock ECLK may be transmitted from the clock gating circuit 20-1 to the scan chain 18-2 even in the capture section during the scan test operation. Accordingly, during the capture section of the scan test operation, the capture operation may be performed exactly at a desired time in the scan chain 18-2. This may improve test time and test coverage.

FIG. 4 shows the test clock gating circuit 300 connected to a single scan chain 18-2. However, scan chains may be configured for each of clock domains according to the operating frequencies of the logic circuits of a semiconductor device, and test clock gating circuits may be respectively connected to the scan chains.

Figure 5:
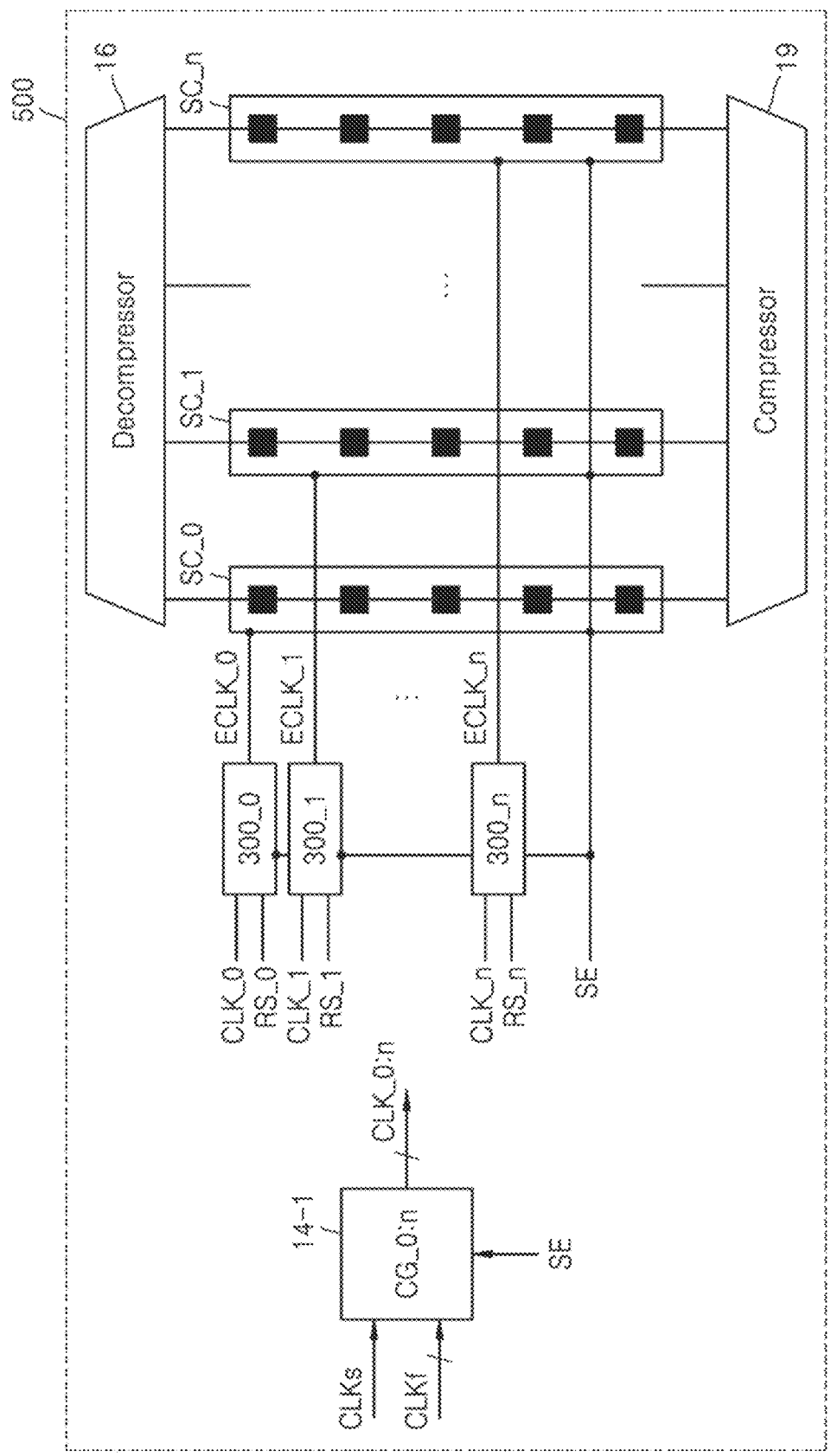
FIG. 5 shows a portion of an LBIST including a plurality of scan chains according to an example embodiment.
Figure 6:
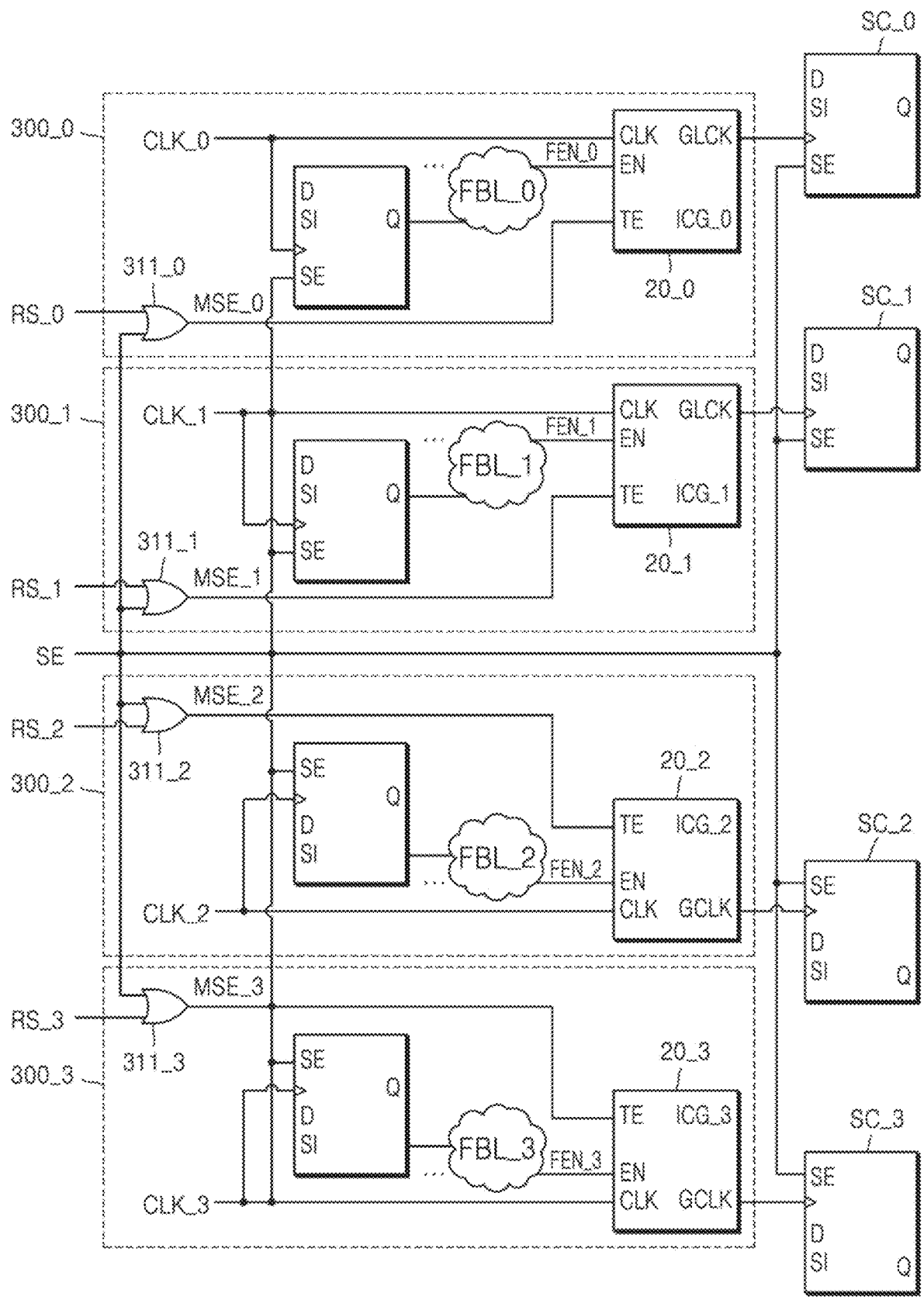
FIG. 6 is a detailed diagram of the plurality of scan chains and test clock gating circuits of FIG. 5 according to an example embodiment.

FIG. 5 shows a portion of a circuit of a logic built-in self-test (LBIST) structure 500 including a plurality of scan chains SC_0 to SC_n according to an example embodiment. FIG. 6 shows detailed connections between four test clock gating circuits 300-0 to 300_3 and four scan chains SC_0 to SC_3 in the circuit of the LBIST structure 500 of FIG. 5.

First, referring to FIG. 5, the LBIST structure 500 may include a clock generator 14-1, a plurality of test clock gating circuits 300_0 to 300_n (which may be referred to as first to nth test clock gating circuits 300_0 to 300_n), a plurality of scan chains SC_0 to SC_n (which may be referred to as first to nth scan chains SC_0 to SC_n), a decompressor 16, and a compressor 19. In the LBIST structure of FIG. 5, blocks identical to those of the LBIST in FIG. 1 are briefly illustrated or omitted for convenience of description.

The clock generator 14-1 may receive shift clocks CLKs and function operation clocks CLKf, and output clocks CLK_0:n in response to the scan enable signal SE. The clock generator 14-1 may output the shift clocks CLKs as clocks CLK_0 to CLK_n when the scan enable signal SE is at logic "1" and may output the function operation clocks CLKf as the clocks CLK_0 to CLK_n in the capture section in which the scan enable signal SE is at logic "0". The frequency of a shift clock CLKs may be slower (or lower) than the frequency of a function operation clock CLKf. The function operation clocks CLKf may have operating frequencies used to operate logic circuits of the scan chains. For example, the clock generator 14-1 may include a first clock generator receiving a shift clock CLKs and a first function operation clock CLKf, and generating a first clock CLK_0 in response to a scan enable signal SE and a second clock generator receiving the shift clock CLKs and a second function operation clock CLKf and generating a second clock CLK_1 in response to the scan enable signal SE.

Each of the plurality of test clock gating circuits 300_0 to 300_n may have the same configuration as that of FIG. 4. Each of the plurality of test clock gating circuits 300_0 to 300_n may include an OR gate, which receives the scan enable signal SE and a corresponding register setting signal among register setting signals RS_O to RS_n and generates a modified scan enable signal MSE. Each of the plurality of test clock gating circuits 300_0 to 300_n may receive a corresponding clock among the plurality of clock signals CLK_0 to CLK_n and may output an enable clock ECLK in response to the modified scan enable signal MSE and the function enable signal FEN.

Each of the plurality of scan chains SC_0 to SC_n may receive the scan enable signal SE and a corresponding enable clock among the plurality of gated enable clocks ECLK_0 to ECLK_n.

The decompressor 16 may transmit scan data. For example, the decompressor 16 may include a pseudo-random pattern generator with a linear feedback shift register, a phase shifter, or the like, but example embodiments are not limited thereto.

The compressor 19 may generate test results on the basis of the captured data. For example, the compressor 19 may include an exclusive-OR (XOR) compactor, a multiple-input signature register, a comparator, and the like, but example embodiments are not limited thereto.

FIG. 5 shows that only one scan chain is connected to one of the test clock gating circuits, but this is only an example. The number of scan chains that may be connected to one test clock gating circuit may vary depending on the configuration of logic circuits operating at the same operating frequency.

FIG. 6 is a detailed diagram of the connection relationship between four test clock gating circuits and four scan chains in the LBIST structure 500 of FIG. 5. Referring to FIG. 6, the first test clock gating circuit 300_0 may include a first OR gate 311_0 and a first clock gating circuit 20_0. The second test clock gating circuit 300_1 may include a second OR gate 311_1 and a second clock gating circuit 20_1. The third test clock gating circuit 300_2 may include a third OR gate 311_2 and a third clock gating circuit 20_2. The fourth test clock gating circuit 300_3 may include a fourth OR gate 311_3 and a fourth clock gating circuit 20_3.

Each of the OR gates may receive the scan enable signal SE and the register setting signal corresponding thereto and generate the modified scan enable signal MSE. For example, the first OR gate 311_0 may receive the scan enable signal SE and a first register setting signal RS_0 and generate a first modified scan enable signal MSE_0. The second OR gate 311_1 may receive the scan enable signal SE and a second register setting signal RS_1 and generate a second modified scan enable signal MSE_1. The third OR gate 311_2 may receive the scan enable signal SE and a third register setting signal RS_2 and generate a third modified scan enable signal MSE_2. The fourth OR gate 311_3 may receive the scan enable signal SE and a fourth register setting signal RS_3 and generate a fourth modified scan enable signal MSE_3.

Each of the first to fourth clock gating circuits 20_0 to 20_3 may output the input clock CLK as the gated enable clock ECLK, in response to a first logic value (e.g., logic "1") of the modified scan enable signal MSE or a first logic value (e.g., logic "1") of the function enable signal FEN. Referring to FIGS. 5 and 6, for example, the first clock gating circuit 20_0 may output a first clock CLK_0 as a first enable clock ECLK_0, in response to logic "1" of the first modified scan enable signal MSE_0 or logic "1" of the first function enable signal FEN_0. The second clock gating circuit 20_1 may output a second clock CLK_1 as a second enable clock ECLK_1, in response to logic "1" of the second modified scan enable signal MSE_1 or logic "1" of the second function enable signal FEN_1. The third clock gating circuit 20_2 may output a third clock CLK_2 as a third enable clock ECLK_2, in response to logic "1" of the third modified scan enable signal MSE_2 or logic "1" of the third function enable signal FEN_2. The fourth clock gating circuit 20_3 may output a fourth clock CLK_3 as a fourth enable clock ECLK_3, in response to logic "1" of the fourth modified scan enable signal MSE_3 or logic "1" of the fourth function enable signal FEN_3.

Each of the first to fourth scan chains SC_0 to SC_3 may load scan test data into the flip-flops in response to input gated enable clocks (e.g., the first to fourth enable clocks ECLK_0 to ECLK_3) and may capture the output of a combinational logic circuit connected to the flip-flops and output the captured data.

The test clock gating circuit to which the register setting signal set to logic "1" is input may accurately transmit the enable clock to the scan chain in the capture section of the scan test operation, and thus, the data generated by logic circuits may be captured on the flip-flops of the scan chain. The test clock gating circuit to which the register setting signal set to logic "0" is input transmits the enable clock to the scan chain or blocks the enable clock, depending on the state of the function enable signal FEN in the capture section of the scan test operation.

In an example embodiment in which it is determined which register setting signal among a plurality of register setting signals is to be set to logic "1", a scan test is performed first in a state in which all register setting signals of the LBIST structure 500 are set to logic "0". Then, a scan chain having a test coverage that is weaker than a reference value may be determined, and the register setting signal corresponding to the scan chain may be set to logic "1".

Additionally, when the scan test operation is performed in a state in which all register setting signals are set to logic "1", all clock gating circuits transmit the enable clocks to the scan chains in the capture section. Therefore, there may be an effect of conducting a test in a state in which power stress of the semiconductor device including the LBIST is high, that is, in a burn-in state.

Figure 7:
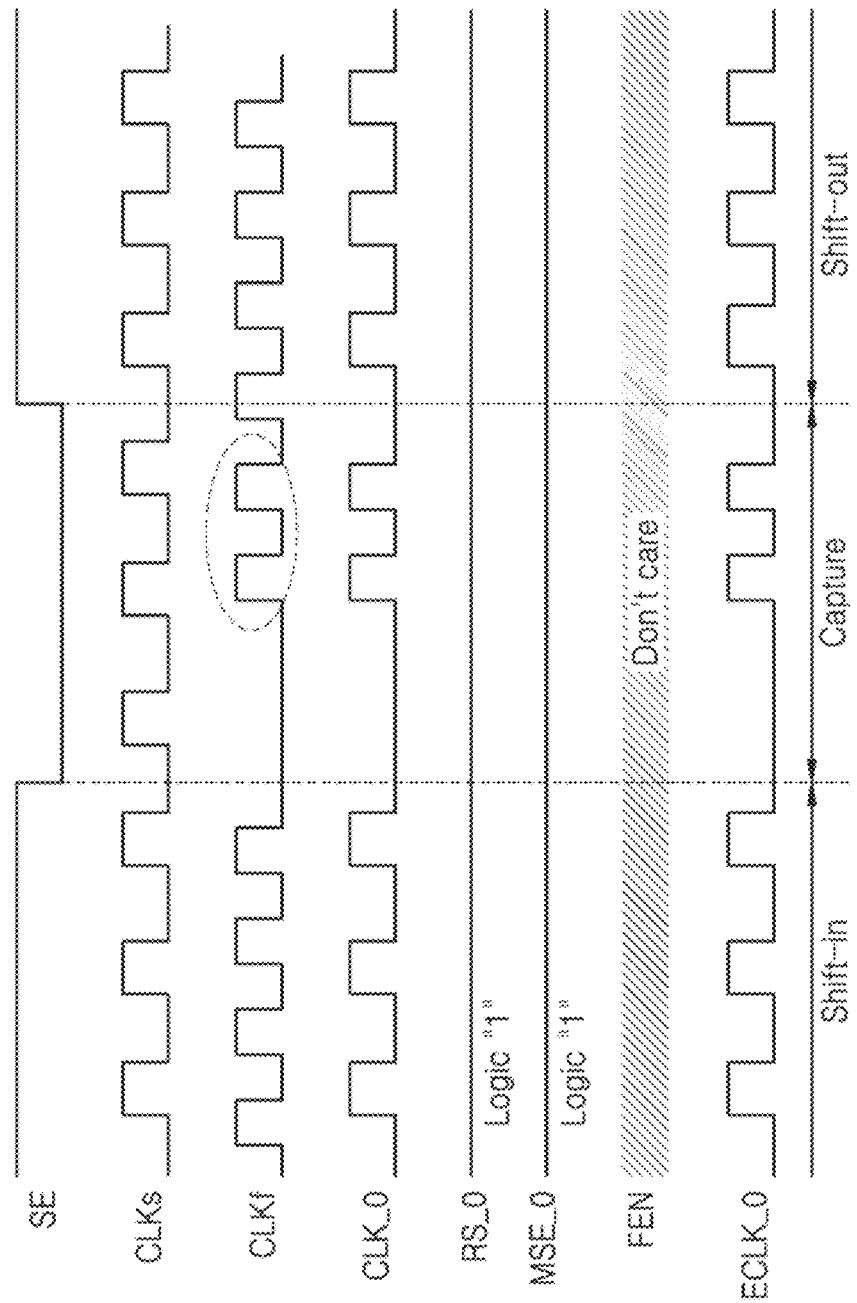
FIG. 7 is a timing diagram of a scan test operation according to an example embodiment.

FIG. 7 is a timing diagram of a scan test operation according to an example embodiment. Referring to FIGS. 5 to 7 together, the scan test operation may sequentially include a shift-in section (Shift-in), a capture section (Capture), and a shift-out section (Shift-out) for each of test patterns. The clock generator 14-1 in the shift-in section (Shift-in) may transmit the shift clock CLKs to the first test clock gating circuit 300_0 via the first clock CLK_0, in response to logic "1" of the scan enable signal SE. The first OR gate 311_0 maintains the first modified scan enable signal MSE_0 at logic "1" in response to logic "1" of the first register setting signal RS_0. The first clock gating circuit 20_0 outputs the first clock CLK_0, which is the same as the shift clock CLKs, to the first scan chain SC_0 via the first enable clock ECLK_0 in response to the first modified scan enable signal MSE_0 of logic "1". The flip-flops of the first scan chain SC_0 may latch scan data in response to the first enable clock ECLK_0 at the same frequency as the shift clock CLKs.

A clock generator 14_1 in the capture section (Capture) may transmit two pulses of the function operation clock CLKf to the first test clock gating circuit 300_0 via the first clock CLK_0 in response to the scan enable signal SE of logic "0". The first clock gating circuit 20_0 may output the first clock CLK_0, which includes two pulses of the function operation clock CLKf, to the first scan chain SC_0 via the first enable clock ECLK_0 in response to the first modified scan enable signal MSE_0 of logic "1", regardless of the function enable signal FEN (e.g., the first to fourth function enable signals FEN_0 to FEN_3). Flip-flops of the first scan chain SC_0 may capture data output from a logic circuit connected to the flip-flops, in response to the first enable clock ECLK_0 including two clocks of the function operation clock CLKf. That is, in an example embodiment, the first register setting signal RS_0 is set to logic "1". Accordingly, data may be accurately captured in the scan chain, regardless of the state of the first function enable signal FEN_0 output by the first function enable logic FBL_0, which is set randomly in the capture section.

The timing diagram of FIG. 7 shows that the clock generator 14-1 outputs two pulses of the function operation clock CLKf in the capture section, but the clock generator 14-1 may output one pulse of the function operation clock CLKf or one pulse of the shift clock CLKs.

The clock generator 14-1 in the shift-out section (Shift-out) may transmit again the shift clock CLKs to the first test clock gating circuit 300_0 via the first clock CLK_0, in response to the scan enable signal SE of logic "1". The first clock gating circuit 20_0 outputs the first enable clock ECLK_0, which is the same as the shift clock CLKs, to the first scan chain SC_0, in response to the first modified scan enable signal MSE_0 of logic "1". The flip-flops of the first scan chain SC_0 may sequentially output the captured data in response to the first enable clock ECLK_0.

Figure 8:
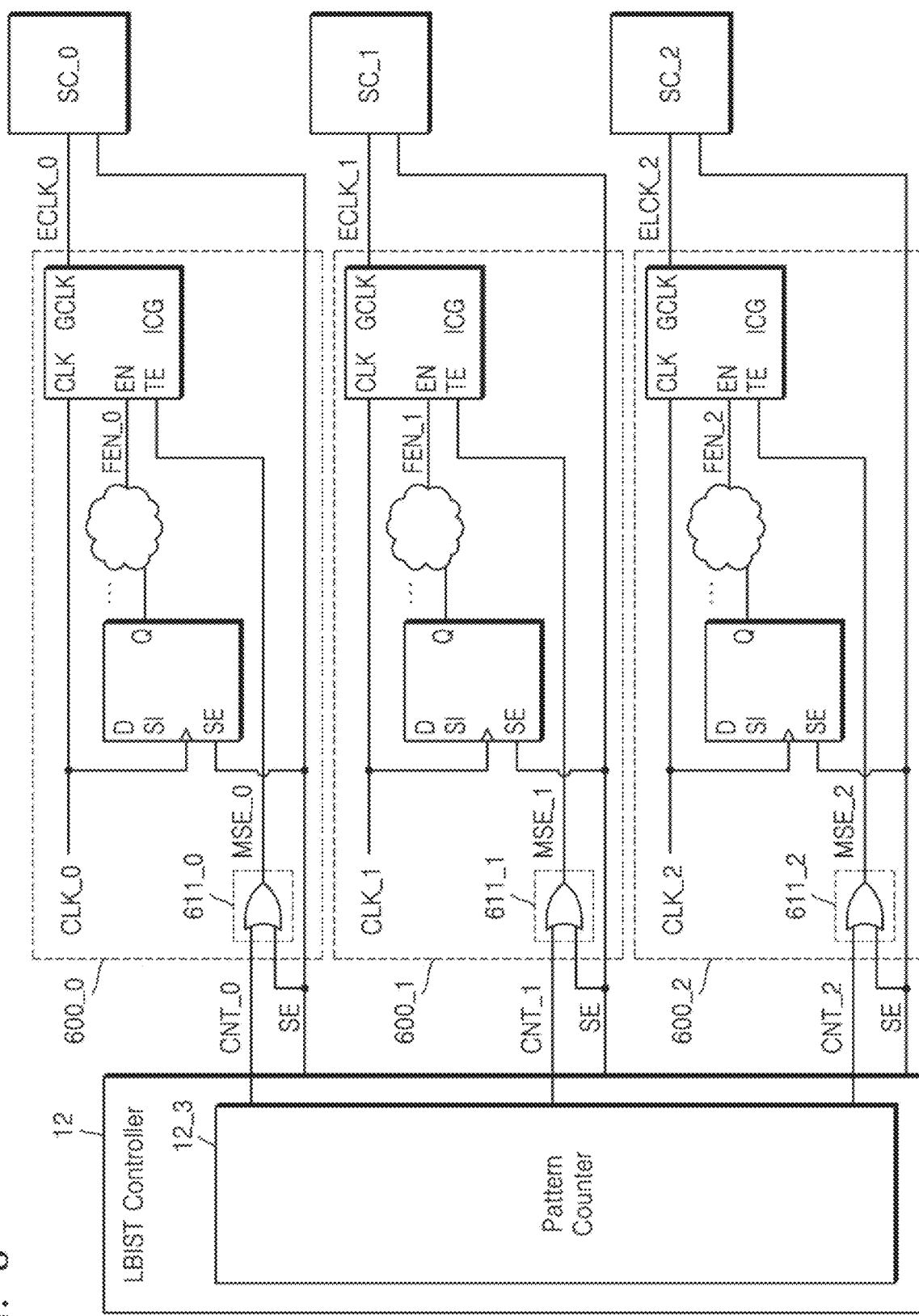
FIG. 8 shows connections between a pattern counter, a test clock gating circuit, and a scan chain in an LBIST according to an example embodiment.
Figure 9:
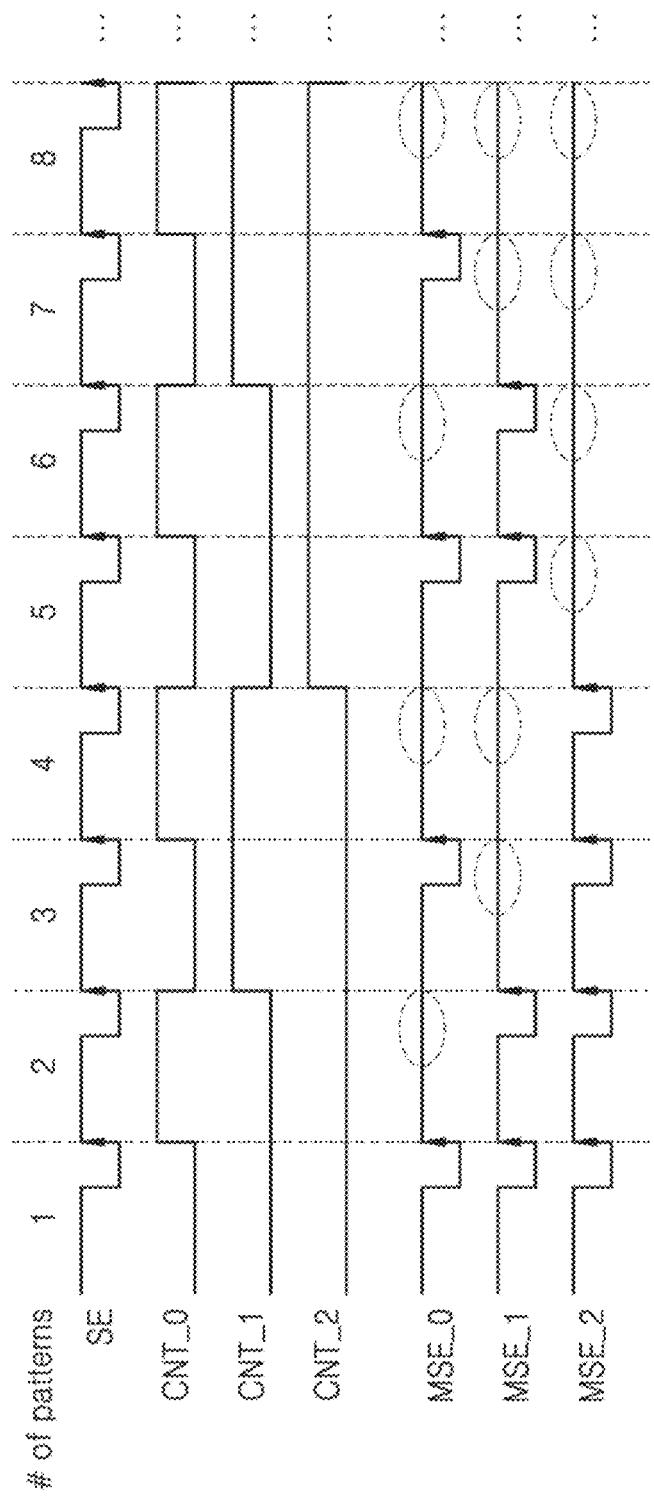
FIG. 9 is a timing diagram of counting signals and modified scan enable signals of the pattern counter of FIG. 8 according to an example embodiment.

FIG. 8 shows connections between a pattern counter, a test clock gating circuit, and a scan chain in an LBIST according to an example embodiment. FIG. 9 is a timing diagram of counting signals and modified scan enable signals of the pattern counter of FIG. 8.

The configuration of FIG. 8 is the same as that of FIGS. 5 and 6 except that, instead of the register setting signal RS, a counting signal CNT of a pattern counter 12_3 is input to an OR gate (e.g., a first OR gate 611_0) of a test clock gating circuit (e.g., a first test clock gating circuit 600_0). FIG. 8 shows only three scan chains (i.e., SC_0 to SC_2) and three test clock gating circuits (i.e., 600_0 to 600_2) connected thereto, but this is only an example. A large number of scan chains may be provided, and test clock gating circuits may be respectively connected to the scan chains. In this case, each of the test clock gating circuits may receive one counting signal corresponding thereto from the pattern counter 12_3.

Referring to FIG. 9, three counting signals CNT_0 to CNT_2 from the pattern counter 12_3 are input to corresponding test clock gating circuits. Also, FIG. 9 illustrates the timing at which a modified scan enable signal is generated. A first counting signal CNT_0 has a first period that toggles when the scan enable signal SE transitions from logic "0" to logic "1", that is, whenever the test pattern starts (e.g., whenever the number of patterns ("# of patterns2" shown in FIG. 9) increases). A second counting signal CNT_1 has a period that is twice as long as the first period of the first counting signal CNT_0. A third counting signal CNT_2 has a period that is twice as long as the period of the second counting signal CNT_1.

When the first counting signal CNT_0 is input to the first OR gate 611_0 of the first test clock gating circuit 600_0, the first modified scan enable signal MSE_0 maintains logic "1" in capture sections of four even-numbered patterns (e.g., numbers "2", "4", "6", and "8" shown in FIG. 9) for each eight pattern, that is, in sections in which the scan enable signal SE is at logic "0". Accordingly, the first enable clock ECLK_0 is transmitted to the first scan chain SC_0 so that accurate capture may be performed. Also, in capture sections of the remaining four odd-numbered patterns (e.g., numbers "1", "3", "5", and "7" shown in FIG. 9), the capture operation may be performed depending on the state of the function enable signal FEN.

When the second counting signal CNT_1 is input to a second OR gate 611_1 of a second test clock gating circuit 600_1, the second modified scan enable signal MSE_1 maintains logic "1" in capture sections of 3rd, 4th, 7th, and 8th patterns for each eight pattern. Accordingly, the second enable clock ECLK_1 is transmitted to a second scan chain SC_1 so that accurate capture may be performed. Also, in capture sections of the remaining 1st, 2nd, 5th, and 6th patterns, the capture operation may be performed depending on the state of the function enable signal FEN.

When the third counting signal CNT_2 is input to a third OR gate 611_2 of a third test clock gating circuit 600_2, the third modified scan enable signal MSE_2 maintains logic "1" in capture sections of 5th, 6th, 7th, and 8th patterns for each eight pattern. Accordingly, accurate capture may be performed in a third scan chain SC_2. Also, in capture sections of the remaining 1st, 2nd, 3rd, and 4th patterns, the capture operation may be performed depending on the state of the function enable signal FEN.

In the LBIST shown in FIG. 8, the enable clock is accurately transmitted to the scan chain in the capture section at a constant rate for each certain number of patterns using pattern counting information. Accordingly, the capture operation is performed accurately and the test coverage is improved.

Figure 10:
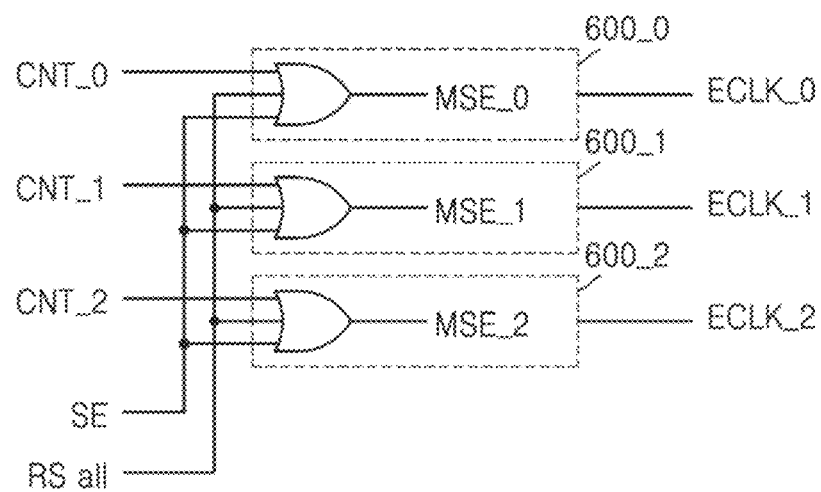
FIG. 10 shows a modified example of OR gates of the test clock gating circuits of FIG. 8 according to an example embodiment.

FIG. 10 shows a modified example of OR gates of the test clock gating circuits of FIG. 8. Referring to FIG. 10, each of OR gates may receive a counting signal corresponding thereto, a scan enable signal SE, and a register setting signal RS_all. When the register setting signal RS_all is set to logic "1", all modified scan enable signals remain at logic "1".

Accordingly, all test clock gating circuits may accurately transmit the enable clock for capture to all scan chains in the capture section.

Figure 11:
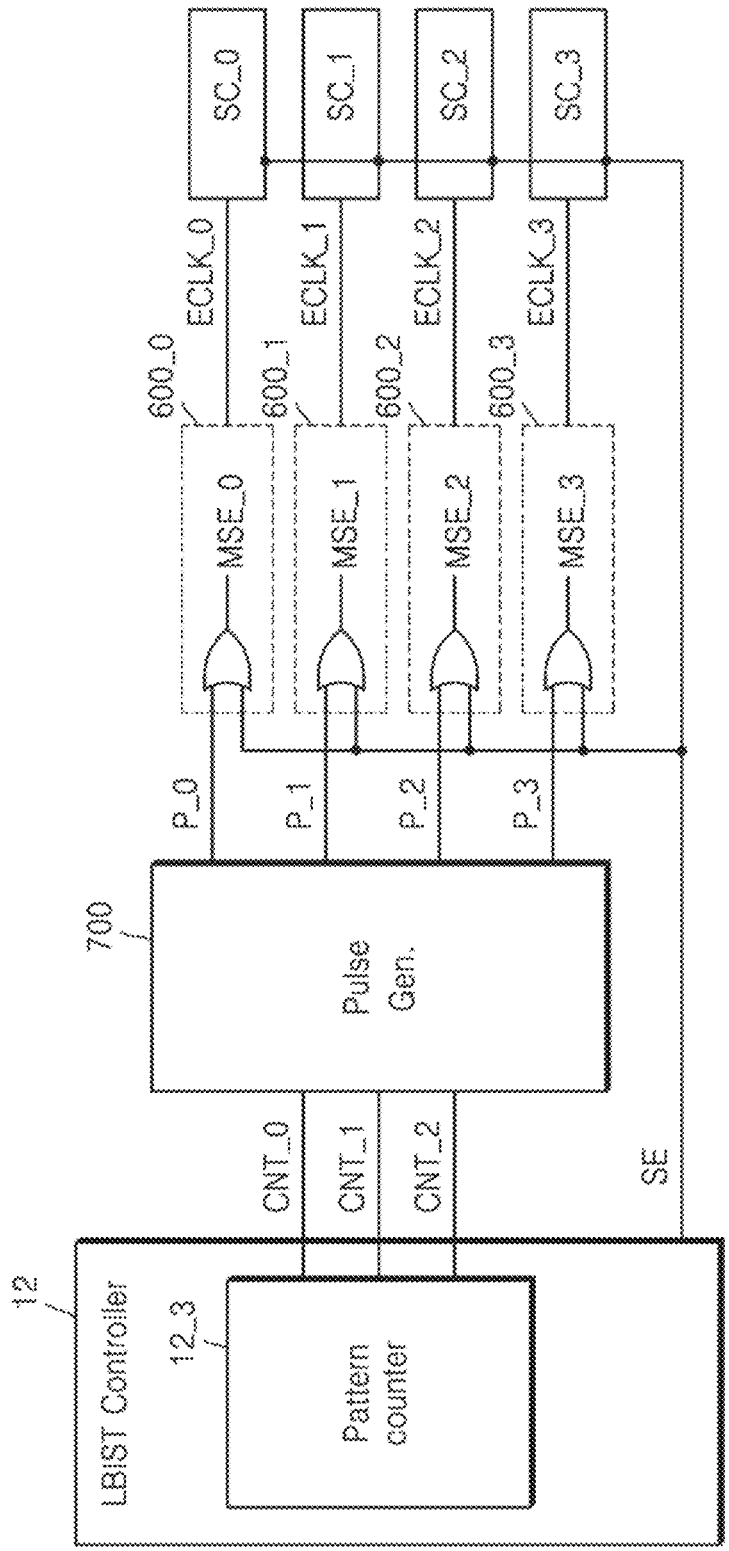
FIG. 11 shows connections between a pattern counter, a pulse generator, test clock gating circuits, and scan chains in an LBIST according to an example embodiment.

FIG. 11 shows connections between a pulse generator, test clock gating circuits, and scan chains in an LBIST according to an example embodiment.

Referring to FIG. 11 compared to FIG. 8, a pulse generator 700 may receive counting signals CNT_0 to CNT_2 of a pattern counter 12_3 and generate a plurality of pulse signals P_0 to P_3. The OR gate of each of the test clock gating circuits may receive one corresponding pulse signal among the plurality of pulse signals P_0 to P_3 and transmit an enable clock to a corresponding scan chain in response to the corresponding one pulse signal.

Figure 12A:
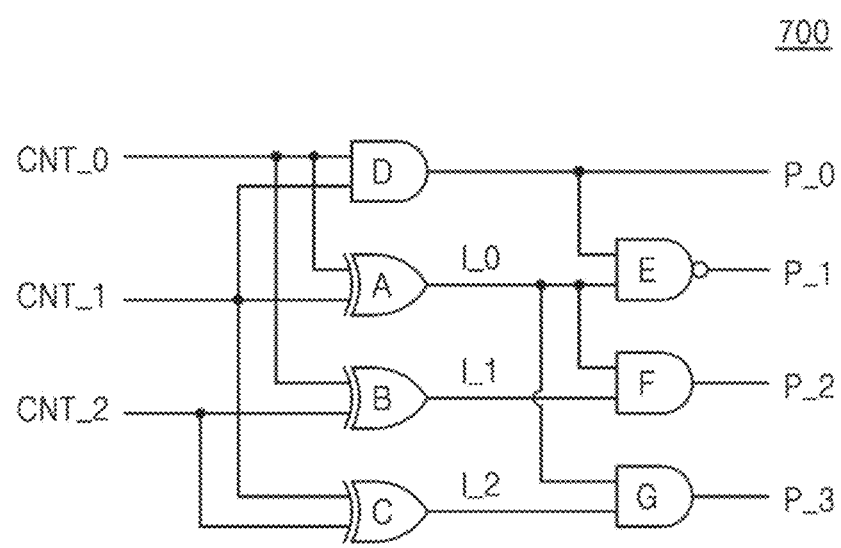
FIG. 12A is a detailed circuit diagram of the pulse generator of FIG. 11 according to an example embodiment.
Figure 12B:
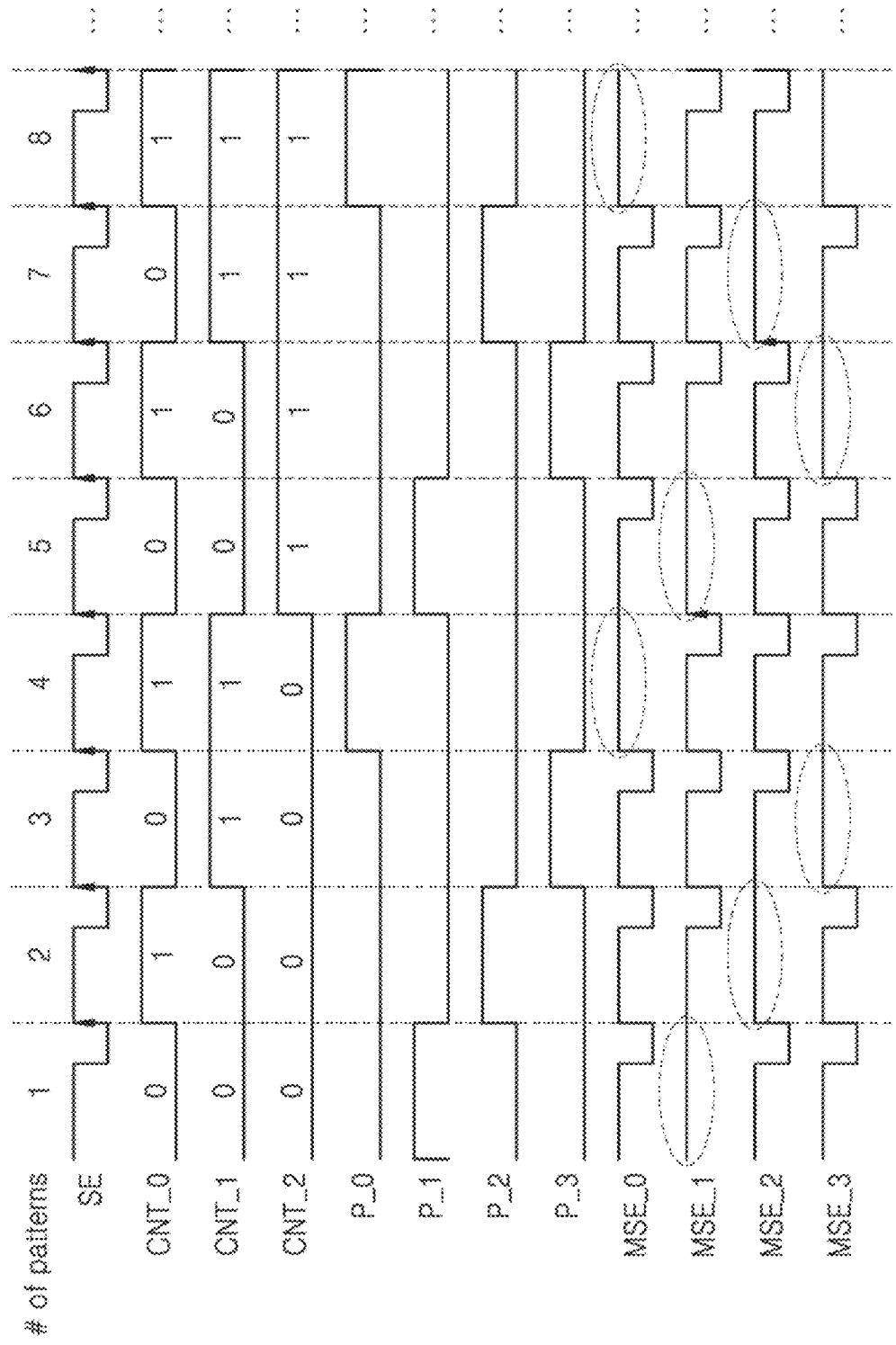
FIG. 12B is a timing diagram of the pulse signals and modified scan enable signals of FIGS. 11 and 12A according to an example embodiment.

FIG. 12A is a detailed diagram of the pulse generator 700 of FIG. 11. FIG. 12B is a timing diagram of the pulse signals and modified scan enable signals of FIGS. 11 and 12A. FIG. 12C is a truth table of the pulse generator of FIG. 12A. Hereinafter, a pulse generator circuit and an operation thereof are described with reference to FIGS. 12A to 12C.

Referring to FIGS. 11 and 12A, the pulse generator 700 may include a first AND gate D that receives a first counting signal CNT_0 and a second counting signal CNT_1 and generates a first pulse signal P_0, a first XOR gate A that receives a second counting signal CNT_1 and the first counting signal CNT_0 and generates a first internal signal I_0, a first NAND gate E that receives the first pulse signal P_0 and the first internal signal I_0 and generates a second pulse signal P_1, a second XOR gate B that receives the first counting signal CNT_0 and a third counting signal CNT_2 and generates a second internal signal I_1, a second AND gate F that receives the first internal signal I_0 and the second internal signal I_1 and generates a third pulse signal I_2, a third XOR gate C that receives the second counting signal CNT_1 and the third counting signal CNT_2 and outputs a third internal signal I_2, and a third AND gate G that receives the first internal signal I_0 and the third internal signal I_2 and generates a fourth pulse signal P_3.

Referring to FIG. 12B, the first counting signal CNT_0 has a first period that toggles for each of test patterns, that is, every time the scan enable signal SE transitions from logic "0" to logic "1". The second counting signal CNT_1 has a second period that is twice as long as the first period of the first counting signal CNT_0. The third counting signal CNT_2 has a period that is twice as long as the second period of the second counting signal CNT_1. The first counting signal CNT_0 toggles whenever the scan enable signal SE transitions from logic "1" to logic "0".

The truth table of FIG. 12C shows logic values of the first to third internal signals I_0 to I_2 and each of the pulses when the first to third counting signals CNT_0 to CNT_2 are input to the pulse generator 700 of FIG. 12A.

Referring to FIGS. 12B and 12C together, each of the four pulse signals P_0 to P_3 may maintain logic "1" only while one pattern is tested for each four test pattern and maintain logic "0" during the test sections of the remaining three patterns. Also, sections of logic "1" of the pulse signals do not overlap with each other (i.e., are offset from each other). Each of the pulse signals may maintain logic "1" for only different half period times for each two period of the first counting signal.

The first pulse signal P_0 may maintain logic "1" in the sections in which the fourth and eighth patterns are tested. The second pulse signal P_1 may maintain logic "1" in the sections in which the first and fifth patterns are tested. The third pulse signal P_2 may maintain logic "1" in the sections in which the second and seventh patterns are tested. The fourth pulse signal P_3 may maintain logic "1" in the sections in which the third and sixth patterns are tested.

FIGS. 12A to 12C illustrate that each of the pulse signals maintains logic "1" only in sections in which one non-overlapping pattern is tested for each four test pattern. However, this may be changed to maintain logic "1" only in sections in which one pattern is tested for each certain number of test patterns, depending on the number of test clock gating circuits of the LBIST circuit.

Referring to FIGS. 11 and 12B together, each of OR gates of the first to fourth test clock gating circuits 600_0 to 600_3 may generate a modified scan enable signal MSE, in response to a corresponding pulse signal and the scan enable signal SE. The first OR gate of the first test clock gating circuit 600_0 that receives the first pulse signal P_0 may maintain logic "1" of the first modified scan enable signal MSE_0 during test sections of the fourth and eighth patterns. Accordingly, the first test clock gating circuit 600_0 may accurately provide the first enable clock ECLK_0 to the first scan chain SC_0 even in the capture sections during the test sections of the fourth and eighth patterns. The second OR gate of the second test clock gating circuit 600_1 that receives the second pulse signal P_1 may maintain logic "1" of the second modified scan enable signal MSE_1 during test sections of the first and fifth patterns. Accordingly, the second test clock gating circuit 600_1 may accurately provide the second enable clock ECLK_1 to the second scan chain SC_1 even in the capture sections during the test sections of the first and fifth patterns. The third OR gate of the third test clock gating circuit 600_2 that receives the third pulse signal P_2 may maintain logic "1" of the third modified scan enable signal MSE_2 during test sections of the second and seventh patterns. Accordingly, the third test clock gating circuit 600_2 may accurately provide the third enable clock ECLK_2 to the third scan chain SC_2 even in the capture sections during the test sections of the second and seventh patterns. The fourth OR gate of the fourth test clock gating circuit 600_3 that receives the fourth pulse signal P_3 may maintain logic "1" of the fourth modified scan enable signal MSE_3 during test sections of the third and sixth patterns. Accordingly, the fourth test clock gating circuit 600_3 may accurately provide the fourth enable clock ECLK_3 to the fourth scan chain SC_3 even in the capture sections during the test sections of the third and sixth patterns.

In the LBIST of FIG. 11, each of the scan chains may accurately receive the enable clock in the capture section while one pattern is tested for each four test pattern. As a result, loss of test coverage due to uncertainty in the capture section by the randomness of the function enable signal FEN in the comparative example may be prevented. For each of the scan chains, an enable clock is transmitted exactly in the capture section for one of the four patterns, that is, 25% of the total test patterns. Also, the enable clock is accurately supplied in the capture section of different patterns for each of the scan chains. Accordingly, appropriate power consumption effects may be expected together with improved test coverage.

Figure 13:
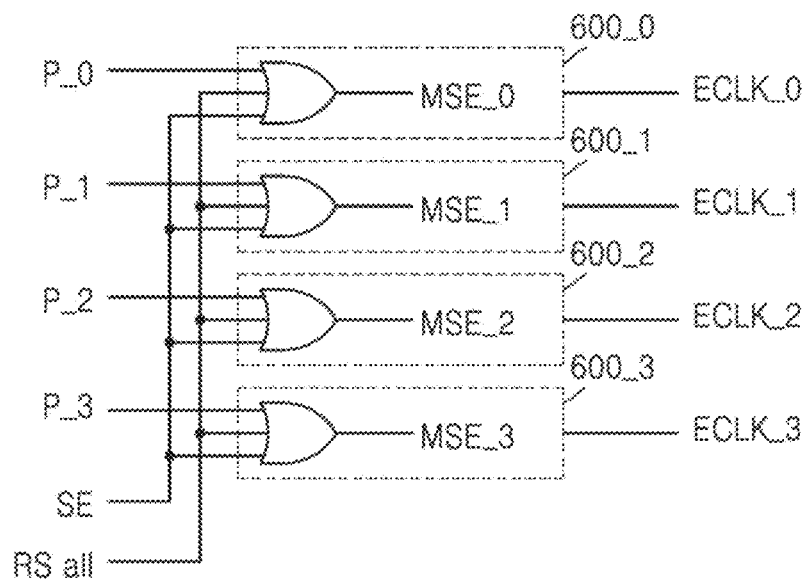
FIG. 13 shows a modified example of OR gates of the test clock gating circuits of FIG. 11 according to an example embodiment.

FIG. 13 shows a modified example of OR gates of the first to fourth test clock gating circuits 600_0 to 600_3 of FIG. 11. Referring to FIG. 13 and comparing FIG. 13 with FIG. 10, each of OR gates may receive a counting signal corresponding thereto, a scan enable signal SE, and a register setting signal RS_all. When the register setting signal RS_all is set to logic "1", all modified scan enable signals MSE_0 to MSE_3 are maintained at logic "1". Accordingly, all test clock gating circuits 600_0 to 600_3 may accurately transmit enable clocks ECLK_0 to ECLK_3 for capture to all scan chains SC_0 to SC_3 in the capture sections.

Figure 14:
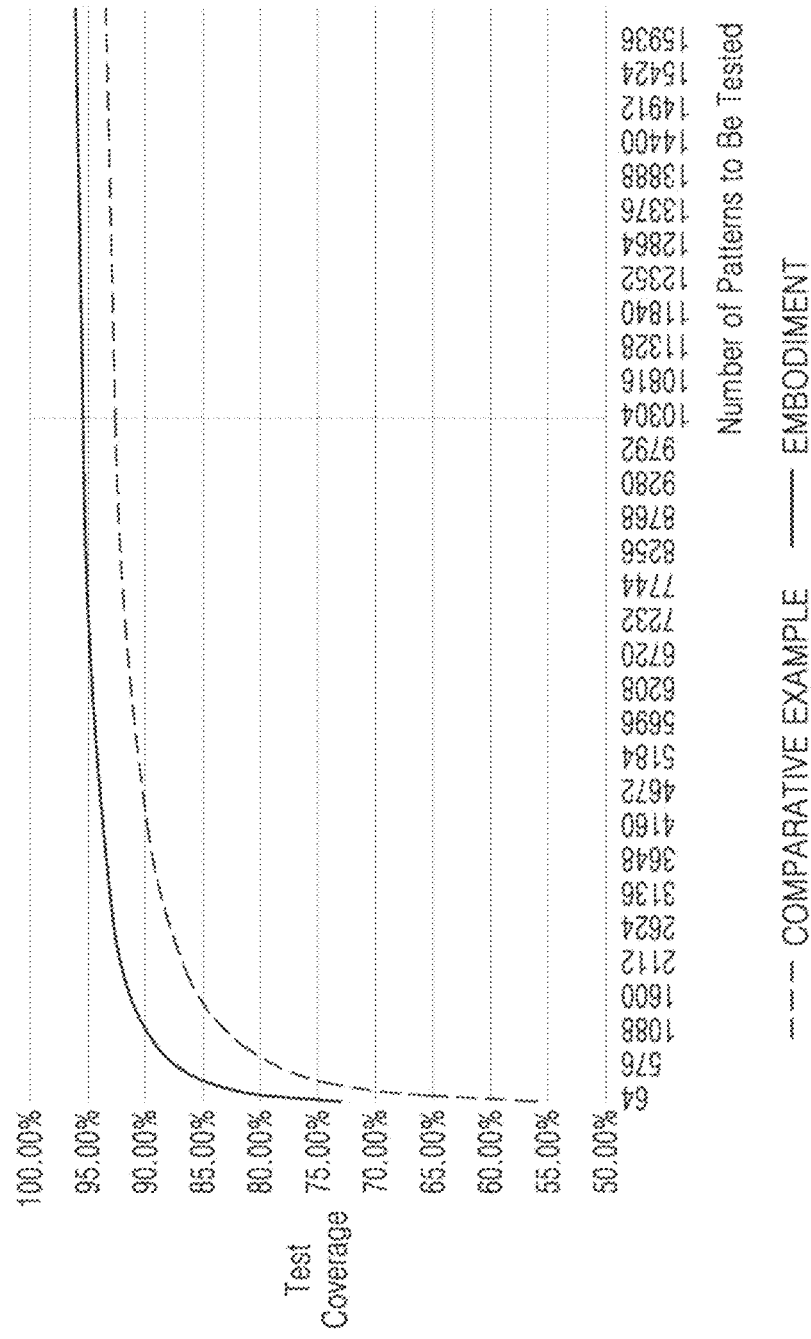
FIG. 14 is a graph showing test coverage of an LBIST according to an example embodiment and test coverage of an LBIST according to a comparative example.

FIG. 14 is a graph showing test coverage of an LBIST according to an example embodiment and test coverage of an LBIST according to a comparative example. In the graph of FIG. 14, the X-axis represents the number of patterns to be tested and the Y-axis represents test coverage. Referring to FIG. 14, the LBIST in which the enable clock is accurately supplied to the scan chain during the capture section of the scan operation may achieve more excellent test coverage than the LBIST according to the comparative example, when the same number of test patterns are tested.

Figure 15:
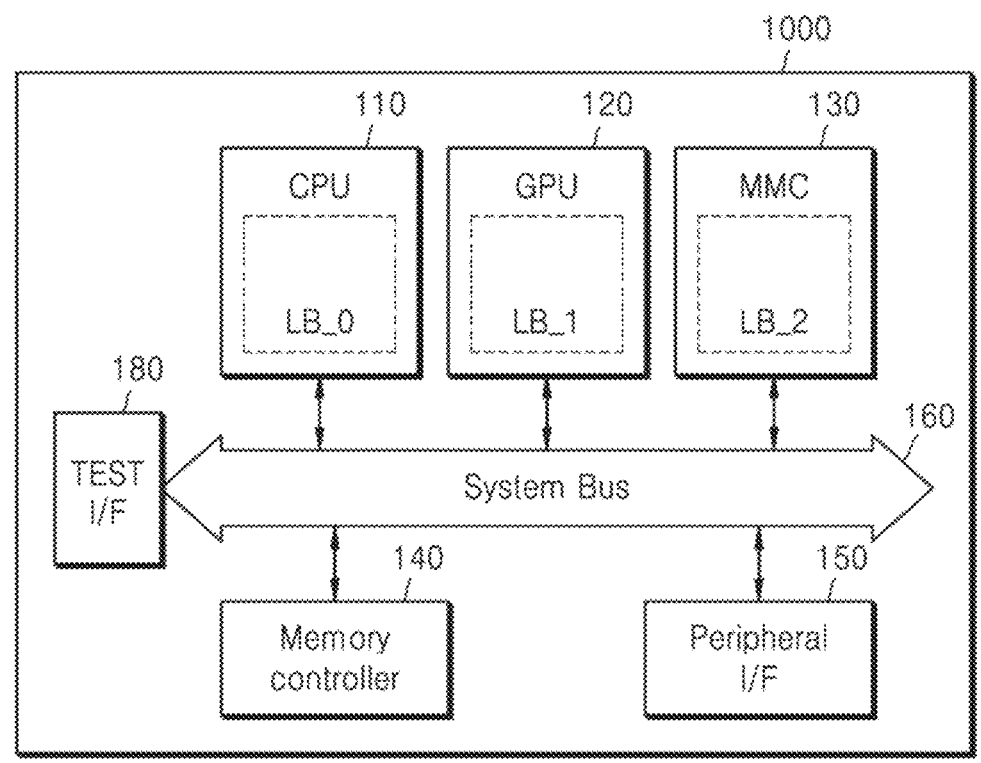
FIG. 15 is a block diagram showing a semiconductor device including a plurality of intellectual property (IP) cores according to an example embodiment.

FIG. 15 is a block diagram showing a semiconductor device 1000 including a plurality of intellectual property (IP) cores according to an example embodiment. For example, an IP core may include circuitry to perform specific functions, and may have a design that includes a trade secret. Referring to FIG. 15, the semiconductor device 1000 may include one or more IP cores 110, 120, 130, 140, and 150 (e.g., a central processing unit (CPU) 110, a graphics processing unit (GPU) 120, a multimedia core (MMC) 130, a memory controller 140, and a peripheral interface 150), a system bus 160, and a test interface 180. For example, the semiconductor device 1000 may include an application processor as a system on chip. The application processor may include IP cores, such as the CPU 110, the GPU 120, the MMC 130, the memory controller 140, and the peripheral interface 150, and the test interface 180, which are connected to each other by a system bus 160. In addition, the application processor may further include a modem. In FIG. 15, each of the IP cores is shown as one, but the semiconductor device 1000 may further include multiple CPUs or multiple GPUs.

An advanced microcontroller bus architecture (AMBA) protocol of Advanced RISC Machine (ARM) may be applied as a standard for the system bus 160. Bus types of the AMBA protocol may include an advanced high-performance bus (AHB), an advanced peripheral bus (APB), an advanced extensible interface (AXI), an AXI4, and an AXI coherency extensions (ACE). In addition, other types of protocols optimized for each system, such as uNetwork, CoreConnect, or Open Core Protocol, may be applied.

The CPU 110 may control all operations of the application processor. For example, the CPU 110 may perform various management operations by executing software for managing the operation of various IP cores in an application processor. As shown in FIG. 15, logic circuits of the CPU 110 may be coupled to a circuit of a first LBIST LB_0 in which a scan chain is formed for each of clock domains and an enable clock is accurately supplied to the scan chain even in a capture section by a test clock gating circuit.

The GPU 120 includes a graphics processing device and renders graphics data. The graphics processing device converts graphics data corresponding to 2-dimensional or 3-dimensional objects into two-dimensional pixel representation and creates a frame for display. The semiconductor device 1000, that is, the application processor, may further include a neural processing unit (NPU) as a computing device that performs calculations for deep learning (or neural network). When a deep learning-based application is executed on an application processor, performance may be guaranteed by the NPU that performs calculations for deep learning. The logic circuits of the GPU 120 and the NPU may be coupled to a circuit of a second LBIST LB_1 in which a scan chain is formed for each of clock domains and an enable clock is accurately supplied to the scan chain even in a capture section by a test clock gating circuit.

The MMC 130 may receive image data from an external source, such as a camera, and directly perform image processing. That is, the MMC 130 may include several modules for recording and playing video, such as recording and playback of video images. The logic circuits of the MMC 130 may be also coupled to a circuit of a third LBIST LB_2 in which a scan chain is formed for each of clock domains and an enable clock is accurately supplied to the scan chain even in a capture section by a test clock gating circuit.

The memory controller 140 serves as a data interface with a memory device that may be connected to the outside of the semiconductor device 1000. The peripheral interface 150 may include a storage interface and a display interface. The memory controller 140 and the peripheral interface 150 may each include the LBIST according to an example embodiment.

The test interface 180 may start a scan test on the LBIST of each of the IP cores using the Joint Test Action Group (JTAG) BIST interface, receive the setting value of setting register signals according to some example embodiments, and output the test result value to the outside.

The semiconductor device including the LBIST according to an example embodiment may achieve high test coverage while maintaining appropriate test power consumption even when mounted on a real systems.

In some example embodiments, each of the components represented by a block as illustrated in FIGS. 1, 2, 4-6, 8, 10, 11, 12A, 13 and 15 may be implemented as various numbers of hardware, and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that is configured to execute the respective functions through controls of one or more microprocessors or other control apparatuses. Also, at least one of these components may further include or may be implemented by a processor such as a central processing unit (CPU) that performs the respective functions, a microprocessor, or the like.

While aspects of example embodiments have been particularly shown and described, it will be understood that various changes in form and details may be made therein without departing from the spirit and scope of the following claims.

What is claimed is:

1. A logic built-in self-test (BIST) circuit comprising:
  a first OR gate configured to receive a scan enable signal and a first register setting signal, and generate a first modified scan enable signal;
  a first clock gating circuit configured to receive a first clock and output a first enable clock, according to the first modified scan enable signal and a first function enable signal;
  a first scan chain configured to load first scan data into first flip-flops according to the first enable clock, capture an output of a first logic circuit connected to the first flip-flops, and output captured data;
  a second OR gate configured to receive the scan enable signal and a second register setting signal, and generate a second modified scan enable signal;
  a second clock gating circuit configured to receive a second clock and output a second enable clock, according the second modified scan enable signal and a second function enable signal; and a second scan chain configured to load second scan data into second flip-flops according to the second enable clock, capture an output of a second logic circuit connected to the second flip-flops, and output the captured data, wherein at least one of the first clock gating circuit and the second clock gating circuit is configured to output a corresponding enable clock, irrespective of a corresponding function enable signal, when a corresponding register setting signal has a first logic value.

2. The logic BIST circuit of claim 1, wherein the first clock gating circuit is further configured to, when the first register setting signal has a second logic value that is different from the first logic value, output or block the first enable clock depending on a state of the first function enable signal in a capture section of a scan test operation.

3. The logic BIST circuit of claim 2, further comprising:
a first clock generator configured to receive a shift clock and a third clock, generate the first clock according to the scan enable signal, and transmit the first clock to the first clock gating circuit; and
a second clock generator configured to receive the shift clock and a fourth clock, generate the second clock according to the scan enable signal, and transmit the second clock to the second clock gating circuit,
wherein the third clock has a same frequency as an operating frequency of the first logic circuit, and
wherein the fourth clock has a same frequency as an operating frequency of the second logic circuit.

4. The logic BIST circuit of claim 3, wherein the first clock is equal to the shift clock when the scan enable signal has the first logic value, and
wherein the first clock comprises one or two pulses of the third clock when the scan enable signal has the second logic value that is different from the first logic value.

5. The logic BIST circuit of claim 4, further comprising:
a decompressor comprising a linear feedback shift register and a phase shifter configured to generate the first scan data and the second scan data; and
a compressor configured to receive output data from each of the first scan chain and the second scan chain and generating test results.

6. A logic built-in self-test (BIST) circuit comprising:
a decompressor configured to sequentially generate a plurality of test patterns;
a pattern counter configured to count a number of the plurality of test patterns and generate counting signals;
a first OR gate configured to receive a scan enable signal and a first counting signal among the counting signals and generate a first modified scan enable signal;
a first clock gating circuit configured to receive a first clock and output a first enable clock, according to the first modified scan enable signal and a first function enable signal; and
a first scan chain configured to load first scan data into first flip-flops according to the first enable clock, capture an output of a first logic circuit connected to the first flip-flops, and output captured data,
wherein the first clock gating circuit is further configured to, when the first counting signal has a first logic value, output the first enable clock irrespective of a state of the first function enable signal.

7. The logic BIST circuit of claim 6, further comprising:
a second OR gate configured to receive the scan enable signal and a second counting signal among the counting signals and generate a second modified scan enable signal;
a second clock gating circuit configured to receive a second clock and output a second enable clock, according to the second modified scan enable signal and a second function enable signal; and
a second scan chain configured to load second scan data into second flip-flops according to the second enable clock, capture an output of a second logic circuit connected to the second flip-flops, and output the captured data,
wherein the second clock gating circuit is further configured to output, when the second counting signal has the first logic value, the second enable clock irrespective of a state of the second function enable signal.

8. The logic BIST circuit of claim 7, wherein the first counting signal has a first period, and
wherein the second counting signal has a second period that is twice as long as the first period.

9. The logic BIST circuit of claim 8, further comprising:
a first clock generator configured to receive a shift clock and a third clock having an operating frequency of the first logic circuit, generate the first clock according to the scan enable signal, and transmit the first clock to the first clock gating circuit; and
a second clock generator configured to receive the shift clock and a fourth clock having an operating frequency of the second logic circuit, generate the second clock according to the scan enable signal, and transmit the second clock to the second clock gating circuit.

10. The logic BIST circuit of claim 9, wherein each of the first OR gate and the second OR gate further is further configured to receive a register setting signal, and
wherein the first clock gating circuit and the second clock gating circuit are further configured to, when the register setting signal has the first logic value, output the first enable clock and the second enable clock, respectively, irrespective of the state of the first function enable signal and the state of the second function enable signal.

11. A logic built-in self-test (BIST) circuit comprising:
a decompressor configured to sequentially generate a plurality of test patterns;
a pattern counter configured to count a number of the plurality of test patterns generated by the decompressor and generate counting signals;
a pulse generator configured to receive at least some of the counting signals and generate pulse signals;
a first OR gate configured to receive a scan enable signal and a first pulse signal among the pulse signals and generate a first modified scan enable signal;
a first clock gating circuit configured to receive a first clock and output a first enable clock, according to the first modified scan enable signal and a first function enable signal; and
a first scan chain configured to load first scan data into first flip-flops according to the first enable clock, and capture and output an output of a first logic circuit connected to the first flip-flops.

12. The logic BIST circuit of claim 11, further comprising:
a second OR gate configured to receive the scan enable signal and a second pulse signal among the pulse signals and generate a second modified scan enable signal;

a second clock gating circuit configured to receive a second clock and output a second enable clock, according to the second modified scan enable signal and a second function enable signal;

a second scan chain configured to load second scan data into second flip-flops according to the second enable clock, and capture and output an output of a second logic circuit connected to the second flip-flops;

a third OR gate configured to receive the scan enable signal and a third pulse signal among the pulse signals and generate a third modified scan enable signal;

a third clock gating circuit configured to receive a third clock and output a third enable clock, according to the third modified scan enable signal and a third function enable signal;

a third scan chain configured to load third scan data into third flip-flops according to the third enable clock, and capture and output an output of a third logic circuit connected to the third flip-flops;

a fourth OR gate configured to receive the scan enable signal and a fourth pulse signal among the pulse signals and generate a fourth modified scan enable signal;

a fourth clock gating circuit configured to receive a fourth clock and output a fourth enable clock, according to the fourth modified scan enable signal and a fourth function enable signal; and a fourth scan chain configured to load fourth scan data into fourth flip-flops according to the fourth enable clock, and capture and output an output of a fourth logic circuit connected to the fourth flip-flops.

13. The logic BIST circuit of claim 12, wherein the counting signals comprise a first counting signal, a second counting signal, and a third counting signal, wherein the first counting signal has a first period that toggles in accordance with transition of a logic value of the scan enable signal, wherein the second counting signal has a second period that is twice as long as the first period, and wherein the third counting signal has a third period that is twice as long as the second period.

14. The logic BIST circuit of claim 13, wherein each of the first to fourth pulse signals has a first logic value in a section in which one pattern is tested for each four test pattern.

15. The logic BIST circuit of claim 14, wherein the first logic values of the first to fourth pulse signals are offset from each other.

16. The logic BIST circuit of claim 11, further comprising a first clock generator configured to receive a shift clock and a third clock having an operating frequency of the first logic circuit, generate the first clock according to the scan enable signal, and transmit the first clock to the first clock gating circuit.

17. The logic BIST circuit of claim 16, wherein the first clock is equal to the shift clock when the scan enable signal is at logic "1", and wherein the first clock is equal to the third clock when the scan enable signal is at logic "0".

18. The logic BIST circuit of claim 13, wherein each of the first to fourth OR gates are further configured to receive a register setting signal, and wherein the first to fourth clock gating circuits are configured to output the first to fourth enable clocks when the register setting signal is at logic "1".

* * * * *